United States Patent

Bjarnø et al.

(10) Patent No.: US 6,749,665 B2
(45) Date of Patent: Jun. 15, 2004

(54) METHOD WHEN CLEANING A FILTER

(75) Inventors: Odd Bjarnø, Oslo (NO); Leif Lindau, Växjö (SE)

(73) Assignee: Alstom Power N.V., Amsterdam (NL)

( * ) Notice: Subject to any disclaimer, the term of this patent is extended or adjusted under 35 U.S.C. 154(b) by 0 days.

(21) Appl. No.: 10/181,886

(22) PCT Filed: Jan. 31, 2001

(86) PCT No.: PCT/SE01/00178
§ 371 (c)(1),
(2), (4) Date: Oct. 23, 2002

(87) PCT Pub. No.: WO01/54797
PCT Pub. Date: Aug. 2, 2001

(65) Prior Publication Data
US 2003/0089234 A1 May 15, 2003

(30) Foreign Application Priority Data
Jan. 31, 2000 (SE) .............................................. 0000277

(51) Int. Cl.⁷ .............................................. B01D 49/04
(52) U.S. Cl. .............................. 95/20; 95/280; 55/283; 55/302
(58) Field of Search .............................. 95/8, 20, 280; 55/283, 302, 303, 341.1

(56) References Cited

U.S. PATENT DOCUMENTS

| | | | | |
|---|---|---|---|---|
| 3,630,004 A | * | 12/1971 | Adair et al. | 96/427 |
| 4,247,313 A | * | 1/1981 | Perry et al. | 55/302 |
| 4,299,597 A | * | 11/1981 | Oetiker et al. | 95/26 |
| 4,384,874 A | * | 5/1983 | Dattilo | 96/426 |
| 4,500,326 A | * | 2/1985 | Sunter | 95/20 |
| 4,786,293 A | * | 11/1988 | Labadie | 95/20 |
| 4,789,387 A | * | 12/1988 | Nemesi et al. | 95/280 |
| 5,094,675 A | * | 3/1992 | Pitt et al. | 95/20 |
| 5,391,218 A | * | 2/1995 | Jorgenson et al. | 95/20 |
| 5,417,728 A | * | 5/1995 | Royle | 55/302 |
| 5,505,763 A | * | 4/1996 | Reighard et al. | 95/19 |
| 5,830,249 A | * | 11/1998 | Hori et al. | 55/283 |
| 5,837,017 A | * | 11/1998 | Santschi et al. | 55/302 |
| 6,171,366 B1 | * | 1/2001 | Vicard et al. | 95/1 |
| 6,309,447 B1 | * | 10/2001 | Felix | 95/280 |
| 2003/0041729 A1 | * | 3/2003 | Finigan | 95/26 |

FOREIGN PATENT DOCUMENTS

| | | |
|---|---|---|
| DE | 3836530 A1 | 5/1990 |
| DE | 19607740 A1 | 9/1997 |
| EP | 0796645 A1 | 9/1997 |
| JP | 05-184834 A * | 7/1993 |
| WO | WO99/28010 A1 | 6/1999 |

\* cited by examiner

Primary Examiner—Robert H. Spitzer
(74) Attorney, Agent, or Firm—Burns, Doane, Swecker & Mathis, L.L.P.

(57) ABSTRACT

When cleaning a barrier filter, comprising a plurality of filter elements, of woven fabric of felt, arranged to separate particles out of a polluted gas, the filter elements are cleaned, separately or in groups, by pressurized air pulses, the frequency, the maximum pressure and the duration of which are varied in order to minimize, by an adjustment, the total emission of dust. The frequency and/or the maximum pressure and/or the duration of the cleaning pulses are varied for a group or a plurality of groups of filter elements. After each cleaning pulse, the maximum value for the instantaneous emission of dust, the emission peak, is determined and the emission peak is used, after cleaning a certain group of filter elements, for selecting the frequency and/or the maximum pressure and/or the duration of the cleaning pulses for this group of filter elements during continued operation.

12 Claims, 1 Drawing Sheet

METHOD WHEN CLEANING A FILTER

FIELD OF THE INVENTION

The present invention refers to a method for cleaning a barrier filter, comprising a plurality of filter elements, of woven fabric or felt, arranged to separate particles out of a polluted gas. The filter elements are cleaned, separately or in groups, by pressurised air pulses, the frequency, the maximum pressure, and the duration of which can be varied in order to minimize, by an adjustment, the total emission of dust and maximise the life of the filter elements.

The method is in particular intended for optimising the cleaning of textile barrier filters, having filter elements in the form of tubes manufactured of woven fabric or felt.

BACKGROUND OF THE INVENTION

When separating particulate pollutions out of a streaming gas, one of the most common methods of cleaning is letting the gas stream through a medium, on the surface of which or in the interior of which the particles are deposited. A general term for these filters is barrier filters. Barrier filters can in principle be built-up of almost all thinkable solid materials, but the build-up principles are commonly either a rigid medium, such as a porous ceramic or a gravel bed, or a flexible medium, such as a woven fabric or felt.

During operation, particles are accumulated on the filter medium and a dust heap is built up. This provides an increased flow resistance and consequently leads to an increased pressure drop over the barrier filter. In the long run, it can completely clog the filter medium. A secure operation requires exchanging or cleaning of the filter elements/filter medium, either on site or by being taken out and, for instance, washed or brushed. To purify gases having a low particle content, disposable filters or filters which are taken out and cleaned were frequently used, and to purify gases having a high particle content, barrier filters which are cleaned on site were frequently used.

The cleaning on site can be done in several ways. In smaller plants it can, for instance, be carried out by movable suction nozzles, but in plants for purifying large gas flows the purification is in the most cases carried out by back-washing, shaking, or a combination of thereof, by way of a short pressurised air pulse providing a shock-like displacement of the filter medium, at the same time as the normal gas flow is replaced by a short-time, counter-directional gas flow.

The effectiveness/efficiency of a barrier filter increases by an increasing thickness of the heap of separated dust. A consequence thereof is that the degree of separation will decrease, when a filter element is cleaned. Thus, it is desirable that one does not clean too often and neither completely removes the formed dust heap. The frequency of the cleaning as well as the intensity of the cleaning should therefor be chosen so that an optimal function is achieved. By optimal function is generally meant either that the time mean value of the dust discharge becomes as small as possible or that the energy consumption for the dust separation is minimised under the sub-condition that a given upper limit for the time mean value of the dust discharge is not exceeded.

A common principle of controlling is to let the operation proceed under increasing flow resistance until the pressure drop over the barrier filter reaches a predetermined upper limit value and then to start a cleaning cycle implying that all filter elements, for instance filter tubes or filter cartridges of textile material, are consecutively cleaned, separately or in groups, whereby all receive a similar treatment. After a completed cleaning cycle, the pressure drop is smaller and, thereafter, one waits until the pressure drop, due to the increasing heap of dust, reaches the predetermined upper limit value, at which the next cleaning cycle is started. Since the pressure drop is not only dependent on the filter medium with dust heap, but also increases with the gas flow, one usually regards resistance as a common term for pressure drop or pressure drop corrected with regard to the volume flow of the gas. Henceforth, resistance referring to this extended meaning is used.

As an alternative, the cleaning cycle can be interrupted when the resistance has decreased with a predetermined difference or reaches a predetermined lower limit value. In such cases, the interrupted cleaning cycle is continued when the pressure drop again reaches the upper limit value, so that the cleaning frequency becomes the same for all filter elements.

THE OBJECT OF THE INVENTION

The main object of the present invention is to devise a method for determining the frequency and intensity for cleaning barrier filters in order to achieve an optimal function, which generally implies aiming at the lowest time mean value for the emission of dust.

A second object is to devise a method for determining the frequency and intensity for cleaning barrier filters, providing an increased life for the filter elements relative to known strategies of cleaning.

A third object is to devise a method for determining the frequency and intensity for cleaning barrier filters, allowing an individual adaption of the cleaning for separate filter elements or groups of filter elements in dependence of the dust load for the particular separate filter element or the actual group of filter elements, and thereby dynamically follow changed operational conditions.

The present invention refers to a method for cleaning a barrier filter, comprising a plurality of filter elements, of woven fabric or felt, arranged to separate particles out of a polluted gas. The filter elements are cleaned, separately or in groups, by pressurized air pulses, the frequency, the maximum pressure, and the duration of which can be varied by an adjustment in order to minimise the total emission of dust and maximise the life of the filter elements.

In the method according to the invention, the frequency and/or the maximum pressure and/or the duration of the pressurised air pulses are varied for a separate filter element, for a group of filter elements, or a plurality of groups of filter elements. After each pulse, the maximum value for the instantaneous emission, the emission peak, is determined, and the emission peak is used, after cleaning a certain group of filter elements, for selecting the frequency and/or the maximum pressure, and/or the duration of the pulses for this group of filter elements during continued operation.

In the ideal picture of a barrier filter, all dust is caught on the surface of the filter elements facing the dust-containing raw gas. However, in practice some dust penetrates into the filter material, usually a felt, and a small share thereof passes through.

The cleaning of barrier filter elements, in the form of tubes, bags, or cartridges, where the dust-containing gas streams from outside and into the element by pressurised air pulses, has to be done with regard to several side effects. With the object to achieve as low emission of dust as possible, one should allow a certain thickness of the dust heap on the filter element. This improves the separation, but as a negative consequence it provides an increased resistance and thus an increased energy consumption. In order to prevent the emission immediately after cleaning from being too large, one does not want to remove the entire dust heap in connection with the cleaning. This sets a limit for the size of the pressurised air pulses (cleaning pulses).

When the pressurised air pulse; during the cleaning, rushes as a pressure wave along the filter material, the latter is moved under large acceleration in a direction opposite to the normal gas flow. The movement is deccelerated abruptly, when the filter material is stretched out and thereafter a reversed movement occurs, which is interrupted when the filter material is stretched against the basket or the like holding the filter element stretched during the operation. At the second decceleration, forces of inertia lead to the fact that remaining dust penetrates deeper into the filter material and the amount which thereby passes through the element provides a noticeable short-time emission increase.

The size of the pressurised air pulse influences this short-time emission peak. Thus, the emission peak can give qualitative information about how much dust that is moved in an undesired direction in the filter material in connection with the cleaning. Thereby, an indication of the degree of clogging in the filter material is obtained and of the clogging velocity as well. The size of the mission peak here comprises the maximum value of the dust emission as well as the difference between the maximum value of the dust emission and the value of the dust emission just before the cleaning pulse.

According to the present invention, it is therefore suggested that one uses the size of the emission peak after cleaning as an indicator of the suitable size of the pressurised air pulse, which was used for cleaning. This can be adapted to every single filter element or to a group of filter elements depending on the construction of the distribution system, which introduces pressurised air pulses into the filter elements of the barrier filter. In a tubular filter, this generally implies that the cleaning is done in rows and that the smallest group is constituted of one row of tubes.

In the method according to the invention, the frequency and/or the maximum pressure and/or the duration of the pressurised air pulses are varied for a separate filter element, for, a group or a plurality of groups of filter elements. Henceforth, by a group of filter elements also one single element is meant. By duration also the actual time lapse of the pulse is comprised, i.e. how fast it increases and how fast it decreases. After each pulse, the maximum value for the instantaneous emission of dust, the emission peak, is determined and the emission peak is used, after cleaning of a certain group of filter elements, for selecting the frequency and/or the maximum pressure and/or the duration of the pulses for this group of filter elements during the continued operation. Suitably, this selection is carried out in such a manner that the pulse parameter combination, which for the actual group of filter elements provides the lowest emission peak, is selected. Thereby certain given sub-conditions should be taken into consideration.

The cleaning frequency can suitably be determined in a conventional way so that the cleaning is done when the pressure drop over the barrier filter reaches a predetermined maximum value, depending on filter material and dust character, for instance between 1000 Pa and 2000 Pa, preferably between 1200 Pa and 1600 Pa.

When a determined maximum value is reached, one or a plurality of groups of filter elements is/are cleaned consecutively until the difference between the maximum value and the noticed pressure drop over the barrier filter amounts to a predetermined value, for instance 20–100 Pa, preferably 30–70 Pa. At this value, the cleaning cycle is interrupted and is resumed when the pressure drop again reaches the predetermined maximum value.

In order to prevent that the life of the filter elements is negatively affected by the actual adjustment, the maximum pressure of the cleaning pulses, during the adjustment as well as during operation, should be kept over a predetermined limit value. This limit value should be chosen dependent on the degree of clogging in the filter material so that one, in connection with an optimal cleaning without interruption, carries out a complete cleaning cycle, i.e. cleans all filter elements in the barrier filter, without reaching the desirable change of the pressure drop, increases this limit value. This can, for instance, be done by increasing the pressure in the pressure tank, from which the air to the pressure pulse is supplied.

Furthermore, it can be appropriate to measure the volume flow for the gas to be purified and in applicable cases the first and the second limit value as well as the desirable change of the pressure drop are adapted to the actual volume flow by defining limit values for the resistance.

BRIEF DESCRIPTION OF THE DRAWINGS

The invention is now to be described in detail with reference to the appended drawings, where FIG. 1 discloses a schematic side-view of a tubular filter with a device for pressurised air pulse cleaning and control equipment adapted for carrying out the method according to the invention.

DETAILED DESCRIPTION OF THE INVENTION

Figure 1:
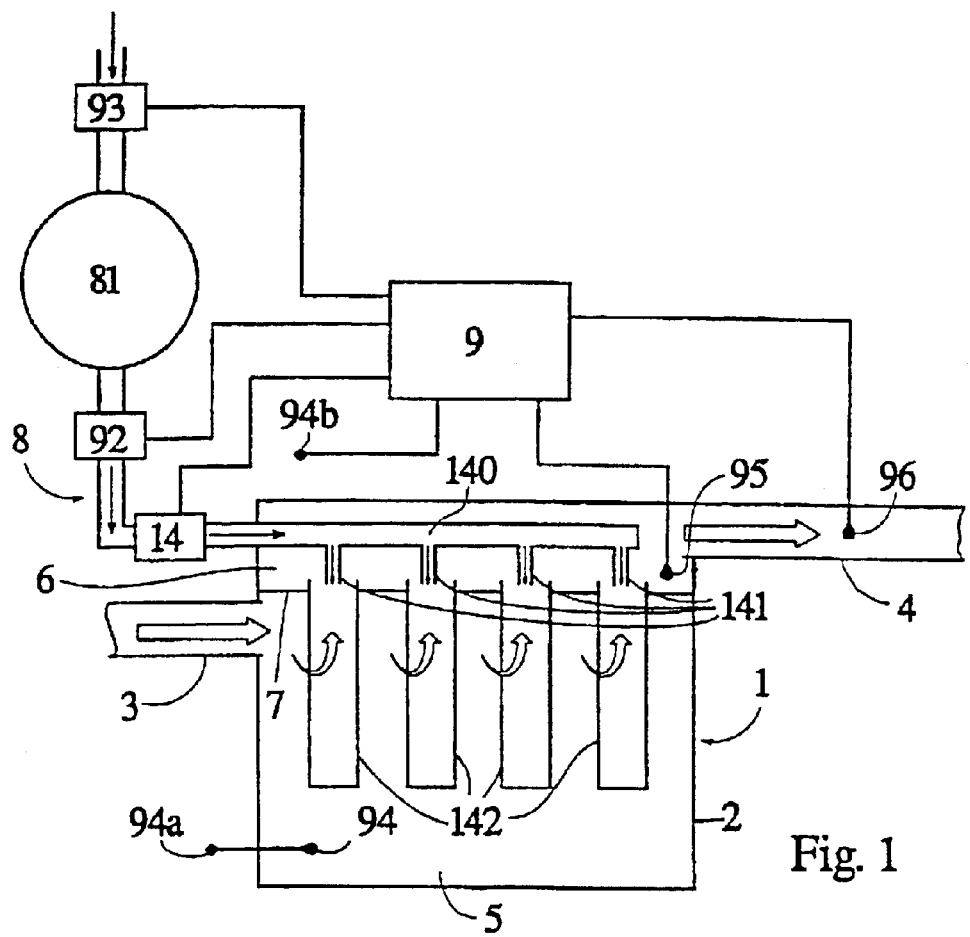
Figure 2:
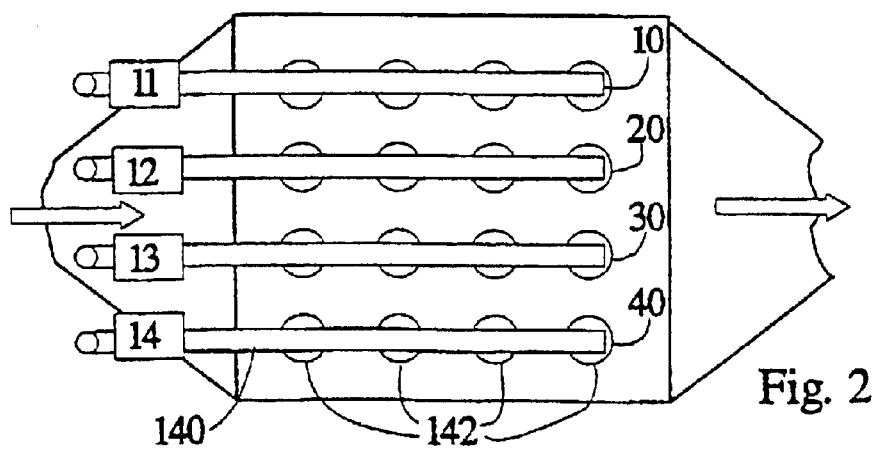
FIG. 2 discloses schematically a view from above of the same tubular filter but without the control equipment.

In FIG. 1 and FIG. 2, a tubular filter 1 with a housing 2, an inlet 3 for the gas to be purified, and an outlet 4 for the purified gas are disclosed. The tubular filter 1 is divided into a raw gas chamber 5 for the incoming gas and a pure gas chamber 6 for the outgoing gas by an intermediate wall 7.

The intermediate wall 7 supports four rows 40, 30, 20, 10, each having four filter tubes 142.

To the tubular filter 1, a system 8 is connected for cleaning the filter tubes 142 by means of pressurized air pulses. To this purpose each row 40 etc. of tubes 142 is provided with a distributing pipe 140 having a nozzle 141 located centrally above each tube 142. For each row 40, 30, 20, 10 there is a separate valve member 14, 13, 12, 11 on the distributing pipe 140.

A pressurised air tank 81 is via a first control member 93 connected to a not shown overpressure source, for instance a compressor, and via a second control member 92 connected to said valve members 14 etc.

For measuring of actual parameters, there are measuring transducers 94 (elements 94$a$ and 94$b$ are connected together) for measuring the pressure in the raw gas chamber 5, measuring transducers 95 for the pressure in the raw gas chamber 6, and measuring transducers 96 for the dust concentration in the outlet 4, and possibly also a (not shown) measuring transducer for the gas volume flow. The control members 93, 92 and the valve members 14 etc. are controlled by a control apparatus 9 based on signals from the measuring transducers 94, 95, 96.

In the method according to the invention, dust-containing gas streams in through the inlet 3 to the raw gas chamber 5 through the tubes 142 and the pure gas chamber 6 via the outlet 4 to a not shown chimney. The pressure in the raw gas chamber 5 and in the pure gas chamber 6 is measured, substantially continuously, by the measuring transducers 95 and 96. During the operation dust which builds up a dust heap on the outer sides of the tubes 142 is separated. When the thickness of the dust heap increases, the pressure drop increases as well. When the pressure difference between the raw gas chamber 5 and the pure gas chamber 6 reaches a first predetermined limit value, for instance 1400 Pa, a row of tubes is cleaned. The new pressure difference is registered. If the pressure difference after the cleaning has fallen less than 50 Pa, another row of tubes is cleaned. This is repeated until that value is achieved. Then, the cleaning is interrupted to be resumed when the pressure drop over the tubes and dust heap, i.e. the pressure difference between the raw gas chamber 5 and the pure gas chamber 6 again reaches 1400 Pa. At this occasion, the tube rows, which were not cleaned at the previous cleaning occasion, are cleaned in the same manner as outlined, and so on.

The method according to the invention corresponds to the description above. The particular subject matter of the invention is that, during an adjustment, the size of the cleaning pulses is varied, for instance by varying the pressure in the pressurised air tank 81, and that the dust concentration in the outlet 4 is measured substantially continuously at least at the cleaning occasion by the measuring transducer 96. In this way, for each individual row of tubes 10 etc., one seeks to determine the pulse size, which provides the lowest emission peak after the cleaning pulse, and uses this pulse size for the continued operation.

What is claimed is:

1. A method for cleaning a barrier filter, comprising a plurality of filter elements, of woven fabric or felt, arranged to separate particles out of a polluted gas, whereby the filter elements are cleaned by pressurised air pulses, the frequency, the maximum pressure, and the duration of which can be varied in order to minimise, by an adjustment, the total emission of dust and maximise the life of the filter elements, wherein the frequency and/or the maximum pressure and/or the duration of the cleaning pulses are varied for a separate filter element, for a group of filter elements or a plurality of groups of filter elements, wherein the maximum value for the instantaneous emission of dust, the emission peak, is determined after each cleaning pulse, and wherein the emission peak is used, after cleaning of a certain group of filter elements, for selecting the frequency and/or the maximum pressure and for the duration of the cleaning pulses for this group of filter elements during continued operation.

2. A method according to claim 1, wherein the pressure drop over the filter unit is measured substantially continuously, wherein the groups of filter elements are cleaned in a predetermined order and wherein cleaning of a group occurs when the resistance or the pressure drop over the filter reaches a first predetermined limit value.

3. A method according to claim 2, wherein, for the continued operation, a combination of maximum pressure and/or duration is selected for the cleaning pulses to a group of filter elements proximate to the one which, during the adjustment, for this group of filter elements provided the lowest emission peak.

4. A method according to claim 2, wherein the first predetermined limit value is set between 1000 and 2000 Pa.

5. The method according to claim 4 wherein the first predetermined limit value is set between 1200 and 1600 Pa.

6. A method according to claim 1, wherein the maximum pressure of the cleaning pulse is maintained over a second predetermined limit value during the adjustment.

7. A method according to claim 6, wherein the second predetermined limit value is selected in dependence of the pressure drop over the filter unit after the separate cleaning pulses.

8. A method according to claim 7, wherein, after accomplished adjustment, the highest of the minimum resistances or the minimum pressure drop after the separate cleaning pulses is determined and this highest resistance or pressure drop is used to determine the second predetermined limit value.

9. A method according to claim 7, wherein, after accomplished adjustment, a weighted mean value of the minimum resistances or the minimum pressure drops after the separate cleaning pulses is determined and this mean value is used to determine the second predetermined limit value.

10. A method according to claim 6, wherein the second predetermined limit value is set between 3 and 5 bar.

11. The method according to claim 10 wherein the second predetermined limit value is set between 3 and 4 bar.

12. A method according to claim 1, wherein, for the continued operation, a combination of frequency and/or maximum pressure and/or duration is selected for the cleaning pulses to a group of filter elements proximate to the one which, during the adjustment, for this group of filter elements provided the lowest emission peak.

* * * * *